(12) United States Patent
Itsubo et al.

(10) Patent No.: US 12,729,999 B2
(45) Date of Patent: Sep. 8, 2026

(54) OPTICAL FIBER SENSING SYSTEM, OPTICAL FIBER SENSING APPARATUS, AND BREAKAGE DETECTION METHOD

(71) Applicant: NEC Corporation, Tokyo (JP)

(72) Inventors: Ryoto Itsubo, Tokyo (JP); Koyo Mori, Tokyo (JP); Naoto Saeki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 301 days.

(21) Appl. No.: 18/645,696

(22) Filed: Apr. 25, 2024

(65) Prior Publication Data

US 2024/0377242 A1 Nov. 14, 2024

(30) Foreign Application Priority Data

May 10, 2023 (JP) ................................ 2023-077595

(51) Int. Cl.
*G01H 9/00* (2006.01)

(52) U.S. Cl.
CPC .................................. *G01H 9/004* (2013.01)

(58) Field of Classification Search
CPC ..................................................... G01H 9/004
USPC ........................................................ 73/657
See application file for complete search history.

(56) References Cited

U.S. PATENT DOCUMENTS

| | | | | |
|---|---|---|---|---|
| 10,254,499 | B1 * | 4/2019 | Cohen | G02B 6/25 |
| 2014/0255023 | A1 * | 9/2014 | Kishida | G01H 9/004 398/21 |
| 2017/0343695 | A1 * | 11/2017 | Stetson | G01V 3/101 |
| 2022/0244097 | A1 * | 8/2022 | Yoda | F17D 5/06 |

FOREIGN PATENT DOCUMENTS

| | | |
|---|---|---|
| JP | 2018-085248 A | 5/2018 |

* cited by examiner

*Primary Examiner* — Peter J Macchiarolo
*Assistant Examiner* — Rodney T Frank
(74) *Attorney, Agent, or Firm* — Sughrue Mion, PLLC

(57) ABSTRACT

An optical fiber sensing system according to the present disclosure includes: an optical fiber cable including an optical fiber and a supporting wire supporting the optical fiber; at least one memory storing instructions; and at least one processor configured to execute the instructions to transmit pulsed light to the optical fiber, also receive an optical signal from the optical fiber, derive a frequency characteristic of vibration generated in the optical fiber, based on the optical signal, and detect whether the supporting wire is broken, based on a frequency characteristic of the vibration.

15 Claims, 13 Drawing Sheets

Fig. 10

| DISTANCE FROM SENSING APPARATUS | LATITUDE/ LONGITUDE |
|---|---|
| a | Xa/Ya |
| b | Xb/Yb |
| c | Xc/Yc |
| d | Xd/Yd |
| e | Xe/Ye |
| f | Xf/Yf |
| : | : |

OPTICAL FIBER SENSING SYSTEM, OPTICAL FIBER SENSING APPARATUS, AND BREAKAGE DETECTION METHOD

INCORPORATION BY REFERENCE

This application is based upon and claims the benefit of priority from Japanese patent application No. 2023-077595, filed on May 10, 2023, the disclosure of which is incorporated herein in its entirety by reference.

TECHNICAL FIELD

The present disclosure relates to an optical fiber sensing system, an optical fiber sensing apparatus, and a breakage detection method.

BACKGROUND ART

In recent years, a technique referred to as optical fiber sensing using an optical fiber as a sensor has been developed. In the optical fiber sensing, it is possible to detect an event occurring around an optical fiber by detecting vibration generated in the optical fiber.

An optical fiber essential for the optical fiber sensing is laid, for example, as an optical fiber cable in a mode in which the optical fiber is supported by a supporting wire. However, in the optical fiber cable in the mode, the supporting wire may be broken due to an influence of disturbance such as a typhoon. When the supporting wire is broken, tension is applied to the optical fiber. As a result, when the optical fiber itself is damaged, accurate sensing cannot be performed.

Thus, a technique for detecting breakage of a supporting wire in an optical fiber cable including an optical fiber and the supporting wire is desired.

As a related art related to such a technique, for example, a technique disclosed in Japanese Unexamined Patent Application Publication No. 2018-085248 is cited.

The technique disclosed in Japanese Unexamined Patent Application Publication No. 2018-085248 is such that a cable has structure in which a conductor wire and an optical fiber are twisted to each other, and thereby, when a load is applied to the cable, the load is easily applied to the optical fiber. Furthermore, an optical apparatus that emits laser light to an optical fiber and detects scattered light of the optical fiber is connected to one end of the optical fiber, an optical fiber sensing is used, and thereby a point where a load is applied to the optical fiber is detected.

However, the technique described in Japanese Unexamined Patent Application Publication No. 2018-085248 described above is a technique for detecting a point where a load is applied to an optical fiber by using optical fiber sensing, and is not a technique for detecting breakage of a supporting wire.

SUMMARY

Thus, in view of a problem described above, an example object of the present disclosure is to provide an optical fiber sensing system, an optical fiber sensing apparatus, and a breakage detection method that are capable of detecting breakage of a supporting wire in an optical fiber cable including an optical fiber and the supporting wire.

In a first example aspect of the present disclosure, an optical fiber sensing system includes:

an optical fiber cable configured to include an optical fiber and a supporting wire supporting the optical fiber;

at least one memory configured to store instructions; and at least one processor configured to execute the instructions to transmit pulsed light to the optical fiber, also receive an optical signal from the optical fiber, and derive a frequency characteristic of vibration generated in the optical fiber, based on the optical signal, and detect whether the supporting wire is broken, based on a frequency characteristic of the vibration.

In a second example aspect of the present disclosure, an optical fiber sensing apparatus includes:

at least one memory configured to store instructions; and at least one processor configured to execute the instructions to transmit pulsed light to an optical fiber in an optical fiber cable including the optical fiber and a supporting wire supporting the optical fiber, also receive an optical signal from the optical fiber, and derive a frequency characteristic of vibration generated in the optical fiber, based on the optical signal, and detect whether the supporting wire is broken, based on a frequency characteristic of the vibration.

In a third example aspect of the present disclosure, a breakage detection method performed by an optical fiber sensing apparatus includes:

a communication step of transmitting pulsed light to an optical fiber in an optical fiber cable including the optical fiber and a supporting wire supporting the optical fiber, and also receiving an optical signal from the optical fiber; and a detection step of deriving a frequency characteristic of vibration generated in the optical fiber, based on the optical signal, and detecting whether the supporting wire is broken, based on a frequency characteristic of the vibration.

BRIEF DESCRIPTION OF DRAWINGS

The above and other aspects, features and advantages of the present disclosure will become more apparent from the following description of certain example embodiments when taken in conjunction with the accompanying drawings, in which:

FIG. 10 is a diagram illustrating an example of a correspondence table held by a determination unit according to the second example embodiment;

EXAMPLE EMBODIMENTS

Hereinafter, example embodiments of the present disclosure will be described with reference to the drawings. Note that, the following description and the drawings are omitted and simplified as appropriate for clarity of description. Further, in the following drawings, the same elements are denoted by the same reference signs, and redundant descriptions are omitted as necessary. Further, a specific numerical value and the like indicated below is merely an example for facilitating understanding of the present disclosure, and is not limited thereto.

First Example Embodiment

Figure 1:
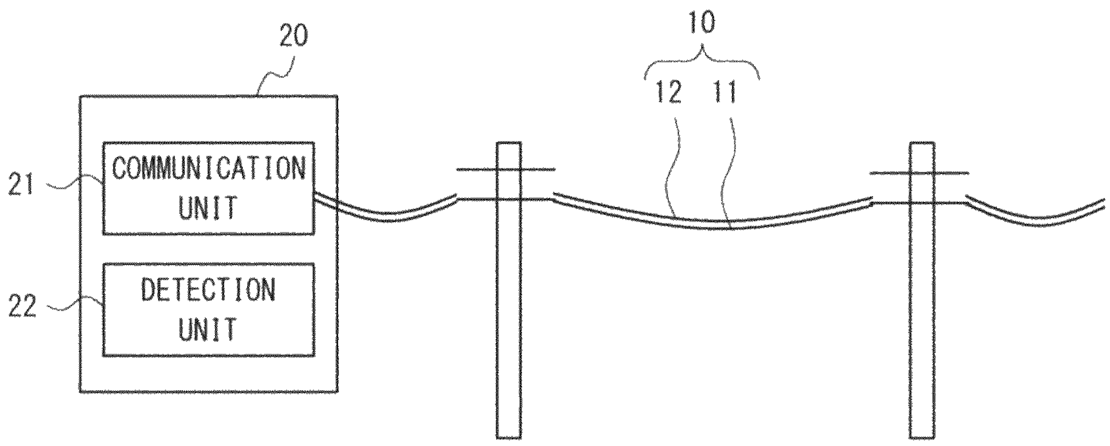
FIG. 1 is a diagram illustrating a configuration example of an optical fiber sensing system according to a first example embodiment.

FIG. 1 illustrates a configuration example of an optical fiber sensing system according to a first example embodiment. As illustrated in FIG. 1, the optical fiber sensing system according to the first example embodiment includes an optical fiber cable 10 and an optical fiber sensing apparatus 20.

The optical fiber cable 10 is a cable including an optical fiber 11, and a supporting wire 12 that supports the optical fiber 11.

Figure 2:
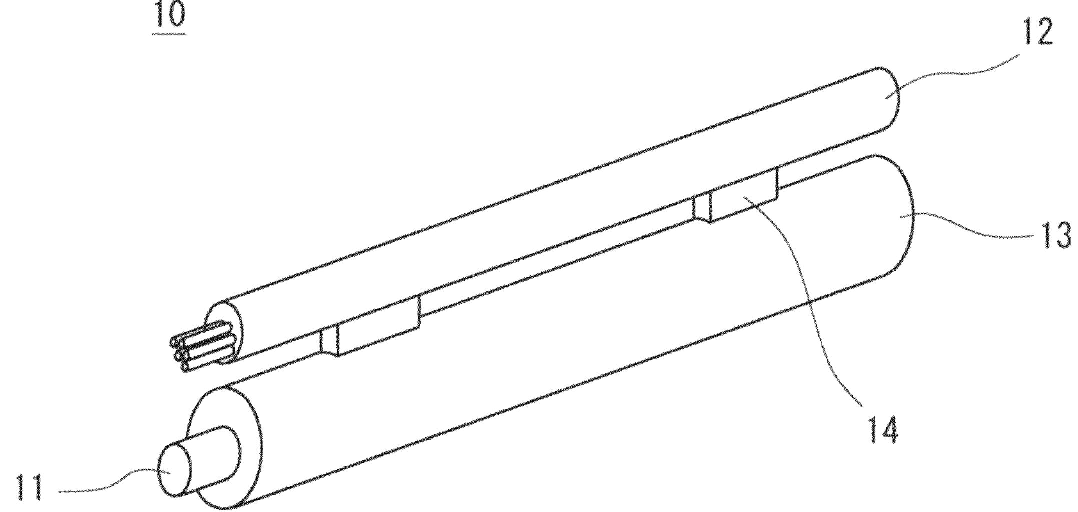
FIG. 2 is a diagram illustrating a structure example of an optical fiber cable according to the first example embodiment.

FIG. 2 illustrates a structure example of the optical fiber cable 10. The optical fiber cable 10 illustrated in FIG. 2 has a structure in which a cable body 13 including the optical fiber 11 and the supporting wire 12 are connected to each other by a neck portion 14, and is also referred to as a self-supporting cable. However, the structure of the optical fiber cable 10 is not limited to the self-supporting cable.

Further, the optical fiber cable 10 is laid in an overhead manner on a pillar such as a utility pole or a steel tower. However, an object suspending the optical fiber cable 10 is not limited to the pillar.

Further, in the optical fiber cable 10, one end of the optical fiber 11 is connected to the optical fiber sensing apparatus 20.

The optical fiber sensing apparatus 20 is achieved by, for example, a sensing apparatus such as a distributed fiber optic sensing (DFOS) apparatus, and includes a communication unit 21 and a detection unit 22.

The communication unit 21 transmits pulsed light to the optical fiber 11 included in the optical fiber cable 10, and also receives, as an optical signal, backscattered light generated when the pulsed light is transmitted through the optical fiber 11.

When vibration is generated in the optical fiber 11, a characteristic (e.g., a wavelength) of an optical signal transmitted through the optical fiber 11 changes.

Thus, the detection unit 22 can detect vibration generated in the optical fiber 11, based on an optical signal received from the optical fiber 11 by the communication unit 21, and can further detect vibration intensity of the vibration.

Further, the detection unit 22 can determine, based on a time difference between a time when pulsed light is transmitted to the optical fiber 11 by the communication unit 21 and a time when an optical signal is received from the optical fiber 11 by the communication unit 21, a point where the optical signal is generated, i.e., a point where vibration detected based on the optical signal is generated (a distance of the optical fiber 11 from the optical fiber sensing apparatus 20).

Thus, the detection unit 22 can derive vibration data indicating vibration intensity of vibration generated at each distance of the optical fiber 11 from the optical fiber sensing apparatus 20.

Figure 3:
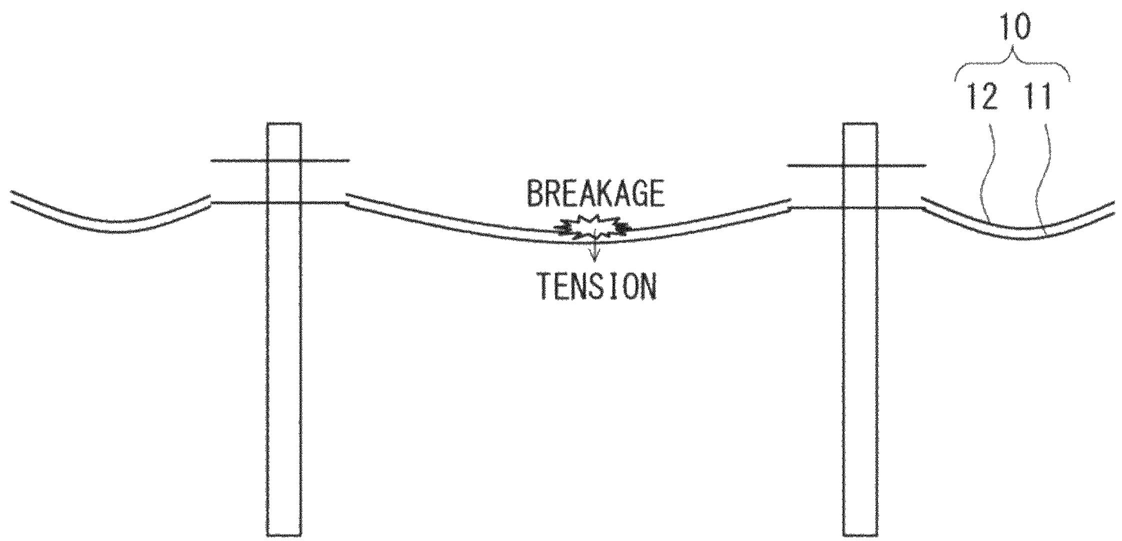
FIG. 3 is a diagram illustrating an example of a state at a time when a supporting wire is broken.

FIG. 3 illustrates an example of a state where the supporting wire 12 included in the optical fiber cable 10 is broken. As illustrated in FIG. 3, when the supporting wire 12 is broken, tension is applied to the optical fiber 11 in an overhead wire direction (gravity direction), and as a result, vibration is generated in the optical fiber 11.

The present inventors have found that a frequency characteristic, that does not appear when the supporting wire 12 is not broken, appears in a frequency characteristic of vibration generated in the optical fiber 11 when the supporting wire 12 is broken. Specifically, the present inventors have found that a frequency characteristic, that does not appear when the supporting wire 12 is not broken, appears in vibration having equal to or less than about 20 Hz (a predetermined frequency) among the vibration generated in the optical fiber 11. Hereinafter, this point will be described in detail.

Figure 4:
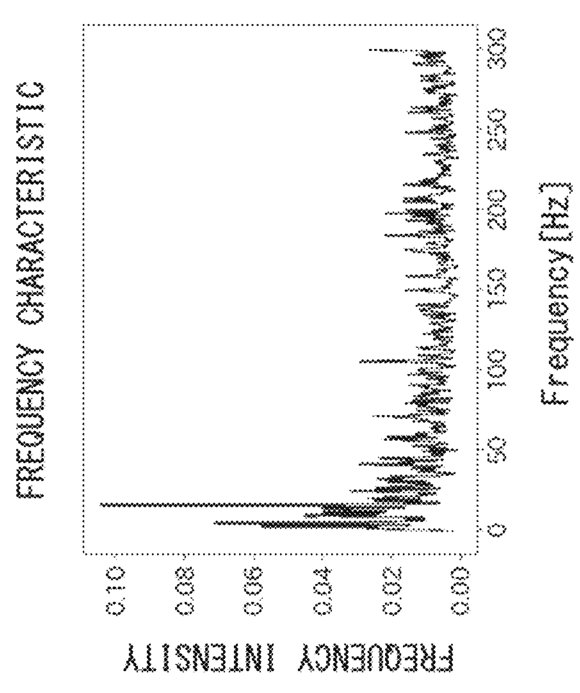
FIG. 4 is a diagram illustrating an example of vibration data and a frequency characteristic of vibration.
Figure 4:
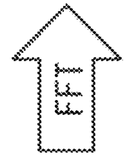
Figure 4:
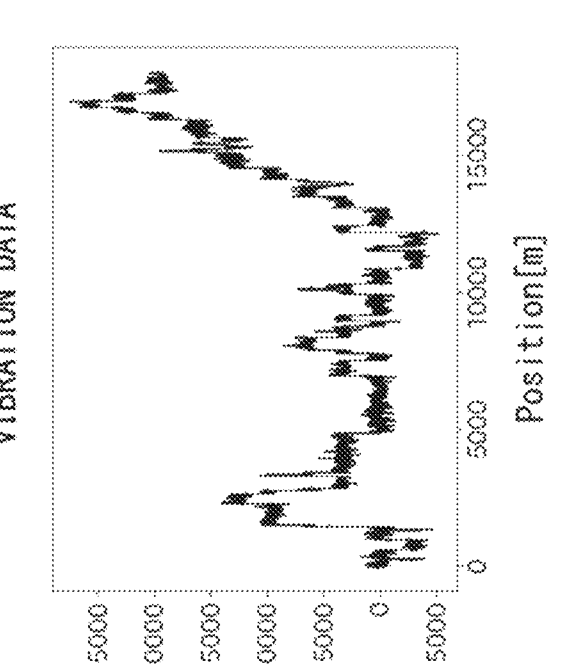

FIG. 4 illustrates an example of vibration data and a frequency characteristic of vibration derived by the detection unit 22.

As described above, the detection unit 22 can derive vibration data as illustrated in a left side of FIG. 4. In the left side of FIG. 4, a horizontal axis indicates a distance of the optical fiber 11 from the optical fiber sensing apparatus 20, and a vertical axis indicates vibration intensity of vibration generated at the distance.

Further, the detection unit 22 can derive a frequency characteristic of vibration as illustrated in a right side of FIG. 4 by performing frequency conversion (herein, fast Fourier transform (FFT)) on the vibration data illustrated in the left side of FIG. 4. The frequency characteristic in the right side of FIG. 4 is an example of a frequency characteristic of vibration generated at a certain distance of the optical fiber 11. In the right side of FIG. 4, the horizontal axis indicates a frequency, and the vertical axis indicates frequency intensity of the frequency.

Figure 5:
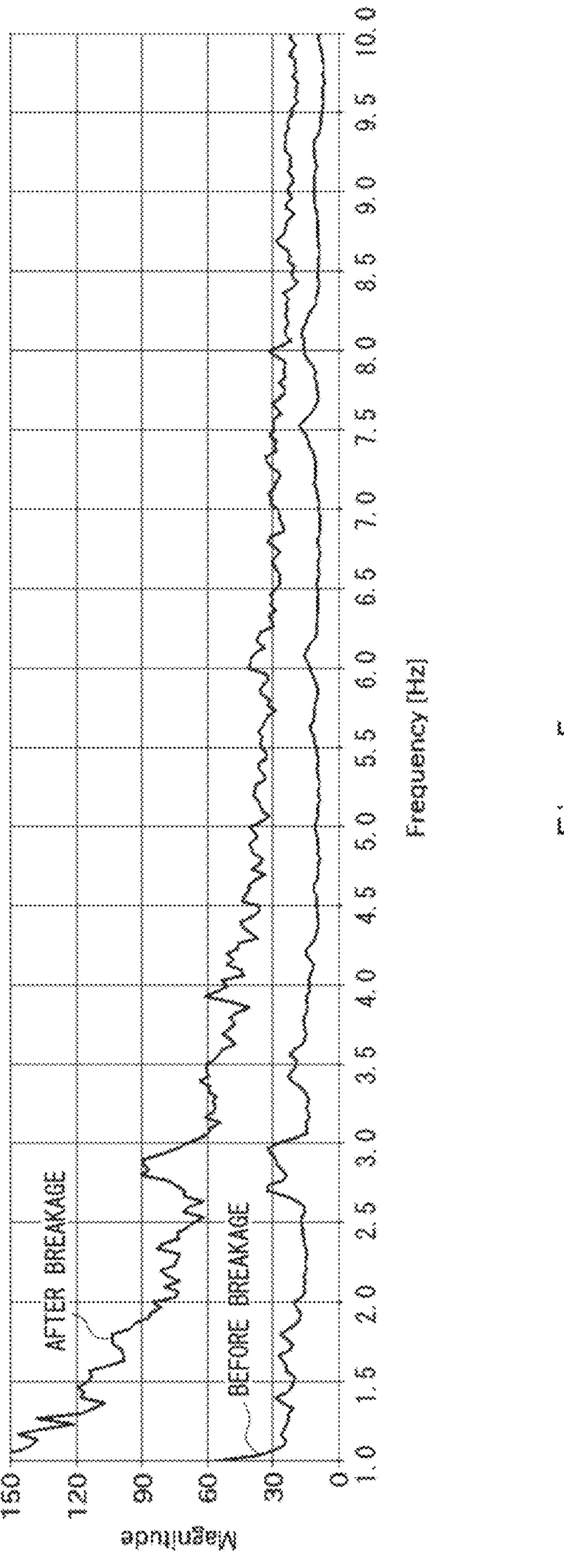
FIG. 5 is a diagram illustrating an example of comparing, before and after breakage of a supporting wire, a frequency characteristic of vibration generated at a distance associated to a breaking position of the supporting wire among a distance of an optical fiber.

FIG. 5 illustrates an example of comparing, before and after breakage of the supporting wire 12, a frequency characteristic of vibration generated at a distance associated to a breaking position of the supporting wire 12 among a distance of the optical fiber 11. In FIG. 5, the horizontal axis indicates a frequency, and the vertical axis indicates frequency intensity of the frequency.

As illustrated in FIG. 5, the frequency characteristic after breaking of the supporting wire 12 tends to have higher frequency intensity of vibration having equal to or less than 10 Hz as compared with the frequency characteristic before breaking, and the tendency is particularly remarkable at equal to or less than about 5 Hz. Note that, FIG. 5 illustrates only the frequency characteristic of the vibration having equal to or less than 10 Hz, but the present inventors confirmed that the tendency, for the frequency intensity after the breakage of the supporting wire 12 to increase, continues from equal to or less than about 20 Hz.

Figure 6:
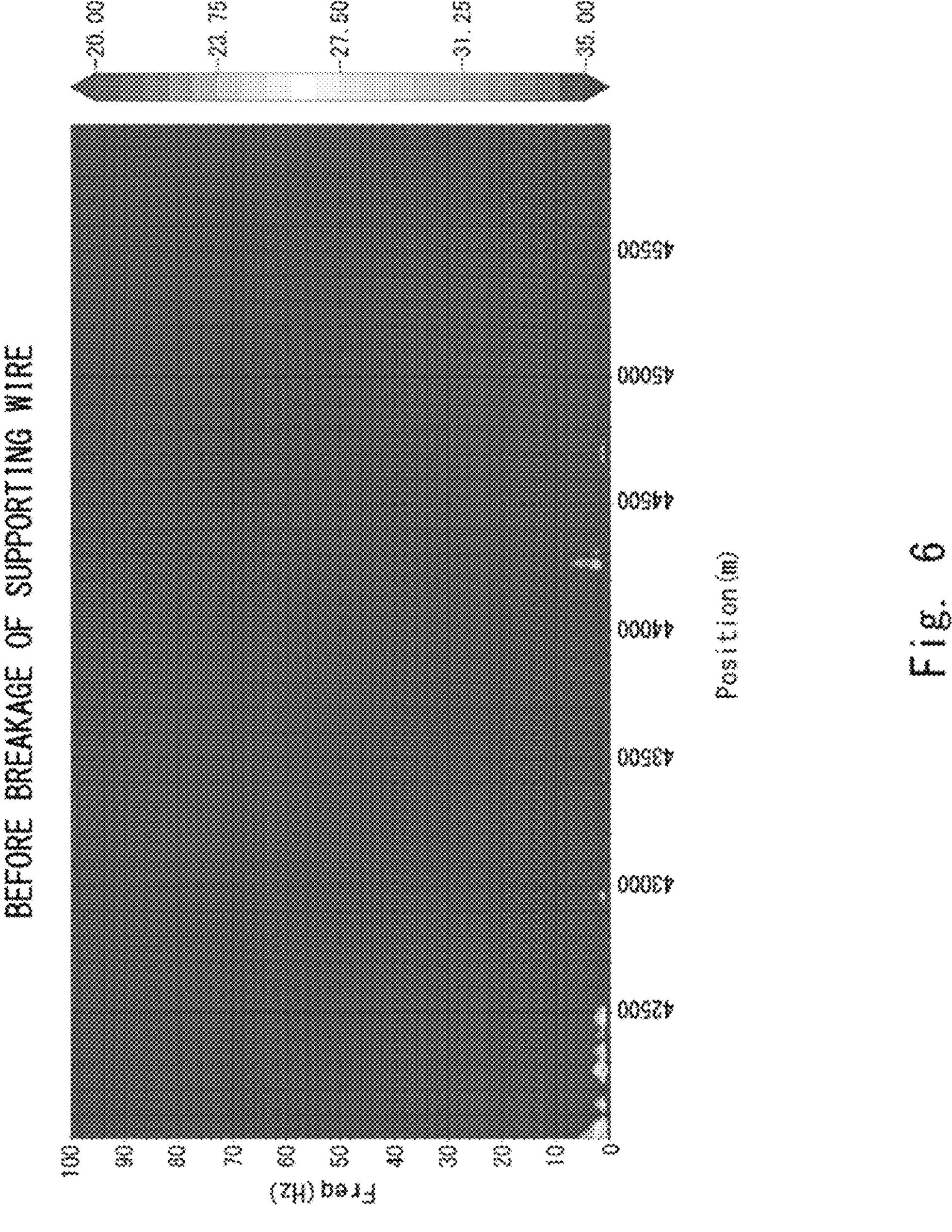
FIG. 6 is a diagram illustrating a frequency characteristic of vibration generated at each distance of an optical fiber before breakage of a supporting wire.
Figure 7:
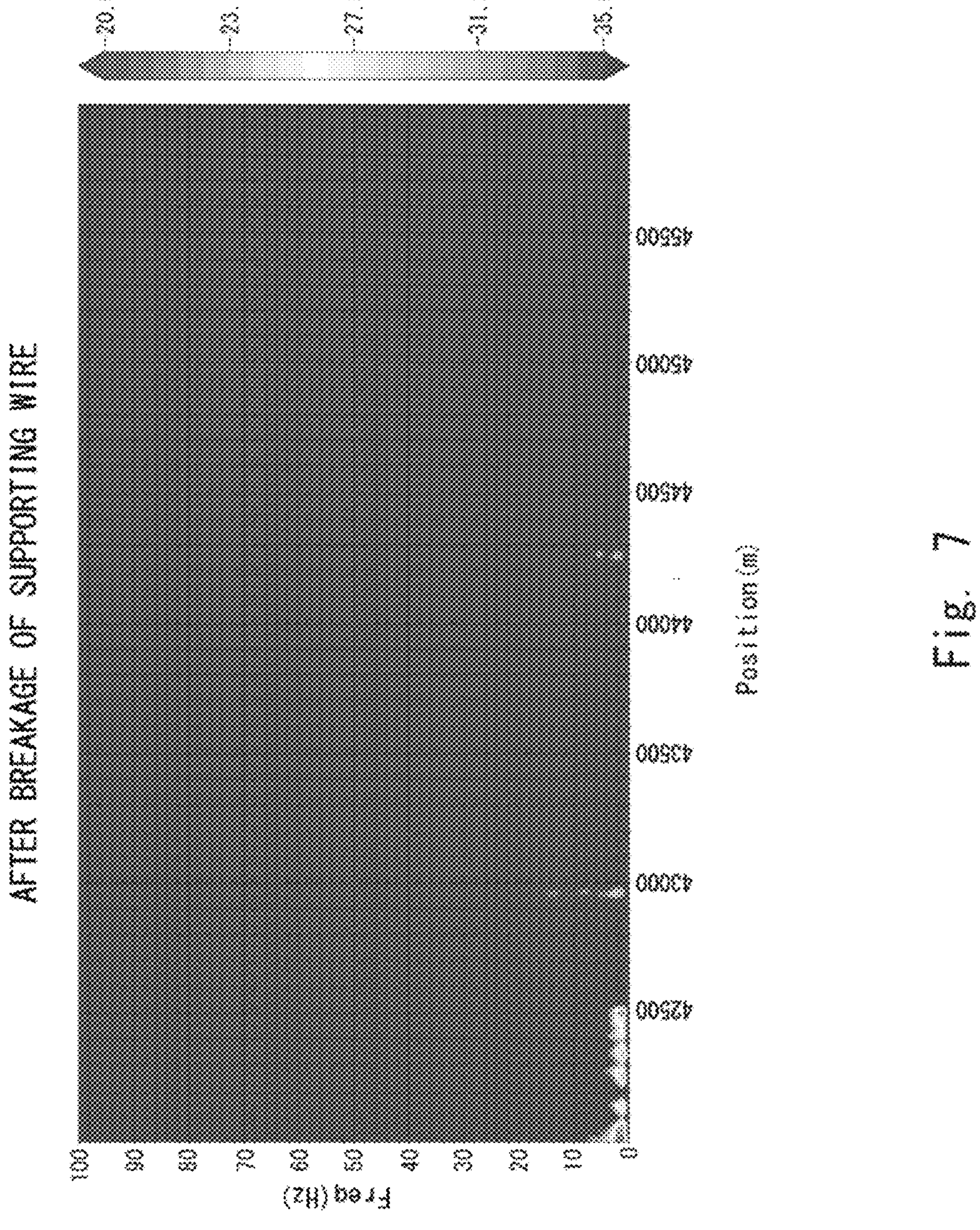
FIG. 7 is a diagram illustrating a frequency characteristic of vibration generated at each distance of an optical fiber after breakage of a supporting wire.

FIG. 6 illustrates a frequency characteristic of vibration generated at each distance of the optical fiber 11 before breakage of the supporting wire 12, and FIG. 7 illustrates a frequency characteristic of vibration generated at each distance of the optical fiber 11 after breakage of the supporting wire 12. In FIGS. 6 and 7, the horizontal axis indicates a distance of the optical fiber 11 from the optical fiber sensing apparatus 20, and the vertical axis indicates a frequency of vibration generated at the distance.

In the examples in FIGS. 6 and 7, it is confirmed that the supporting wire 12 is actually broken at a position associated to a distance of about 43000 m of the optical fiber 11. Thus, as illustrated in FIGS. 6 and 7, when attention is paid to the frequency characteristic of the optical fiber 11 around a distance of about 43000 m, it can be seen that the vibration having about 20 Hz, that does not appear before the breakage of the supporting wire 12, appears after the breakage of the supporting wire 12.

Thus, in the first example embodiment, the detection unit 22 derives a frequency characteristic (e.g., a frequency characteristic as illustrated in FIGS. 5 to 7) of vibration generated in the optical fiber 11, based on an optical signal received from the optical fiber 11 by the communication unit 21, and detects whether the supporting wire 12 is broken, based on the derived frequency characteristic of the vibration. Specifically, the detection unit 22 detects whether the supporting wire 12 is broken, based on vibration having equal to or less than about 20 Hz (a predetermined frequency) among the vibration generated in the optical fiber 11.

Figure 8:
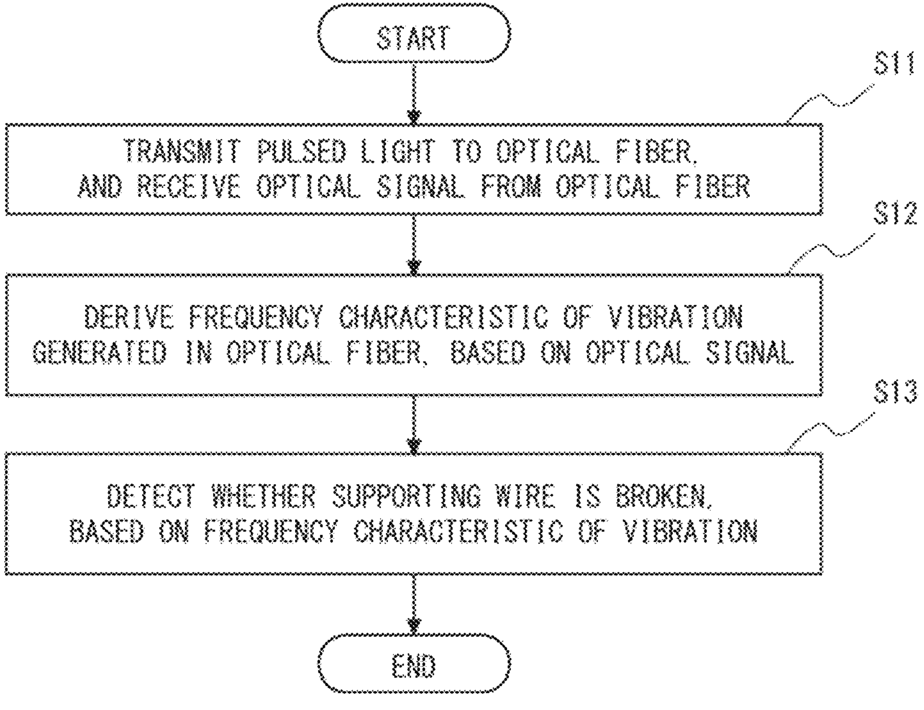
FIG. 8 is a flowchart illustrating an example of a flow of a schematic operation of the optical fiber sensing system according to the first example embodiment.

Subsequently, a schematic operation of the optical fiber sensing system according to the first example embodiment will be described. FIG. 8 illustrates an example of a flow of a schematic operation of the optical fiber sensing system according to the first example embodiment.

As illustrated in FIG. 8, the communication unit 21 transmits pulsed light to the optical fiber 11 included in the optical fiber cable 10, and also receives, as an optical signal, backscattered light from the optical fiber 11 (step S11).

Next, the detection unit 22 derives a frequency characteristic of vibration generated in the optical fiber 11, based on the optical signal received by the communication unit 21 in step S11 (step S12).

Thereafter, the detection unit 22 detects whether the supporting wire 12 included in the optical fiber cable 10 is broken, based on the frequency characteristic of the vibration derived in step S12 (step S13).

As described above, according to the first example embodiment, the communication unit 21 transmits pulsed light to the optical fiber 11 included in the optical fiber cable 10, and also receives an optical signal from the optical fiber 11. The detection unit 22 derives a frequency characteristic of vibration generated in the optical fiber 11, based on the optical signal, and detects whether the supporting wire 12 included in the optical fiber cable 10 is broken, based on the derived frequency characteristic of the vibration. As a result, it is possible to detect breakage of the supporting wire 12 in the optical fiber cable 10 including the optical fiber 11 and the supporting wire 12.

Second Example Embodiment

Figure 9:
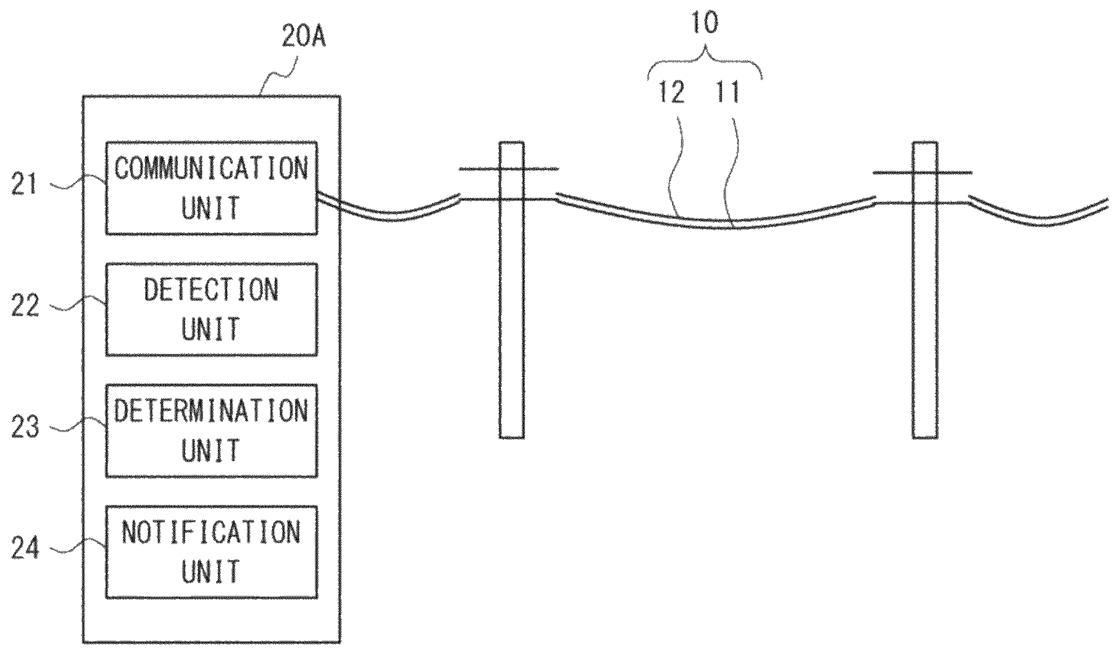
FIG. 9 is a diagram illustrating a configuration example of an optical fiber sensing system according to a second example embodiment.

FIG. 9 illustrates a configuration example of an optical fiber sensing system according to a second example embodiment. As illustrated in FIG. 9, the optical fiber sensing system according to the second example embodiment is different, as compared with the optical fiber sensing system according to the first example embodiment, in that the optical fiber sensing apparatus 20 is replaced with an optical fiber sensing apparatus 20A. Further, the optical fiber sensing apparatus 20A according to the second example embodiment is different, as compared with the optical fiber sensing apparatus 20 according to the first example embodiment, in that a determination unit 23 and a notification unit 24 are added.

The determination unit 23 holds a correspondence table indicating a distance of an optical fiber 11 from the optical fiber sensing apparatus 20A, and a latitude/longitude at the distance. FIG. 10 illustrates an example of the correspondence table. Note that, the correspondence table is not limited to being held by the determination unit 23. For example, a mode, in which any component inside or outside the optical fiber sensing apparatus 20A holds a correspondence table and the determination unit 23 reads and uses the correspondence table, may be applicable.

When a detection unit 22 decides that a supporting wire 12 is broken, the determination unit 23 determines a distance associated to a breaking position of the supporting wire 12 among a distance of the optical fiber 11 from the optical fiber sensing apparatus 20A, based on pulsed light being transmitted to the optical fiber 11 by a communication unit 21 and an optical signal being received from the optical fiber 11 by the communication unit 21. Specifically, the determination unit 23 determines the distance associated to the breaking position of the supporting wire 12, based on a time difference between a time when the pulsed light is transmitted and a time when the optical signal is received. Furthermore, the determination unit 23 determines the breaking position (latitude/longitude) where the supporting wire 12 is broken by using the determined distance and the correspondence table. For example, in the example in FIG. 10, when the distance associated to the breaking position of the supporting wire 12 is a distance aa, the determination unit 23 determines the breaking position of the supporting wire 12 as latitude/longitude: Xa/Ya.

Figure 11:
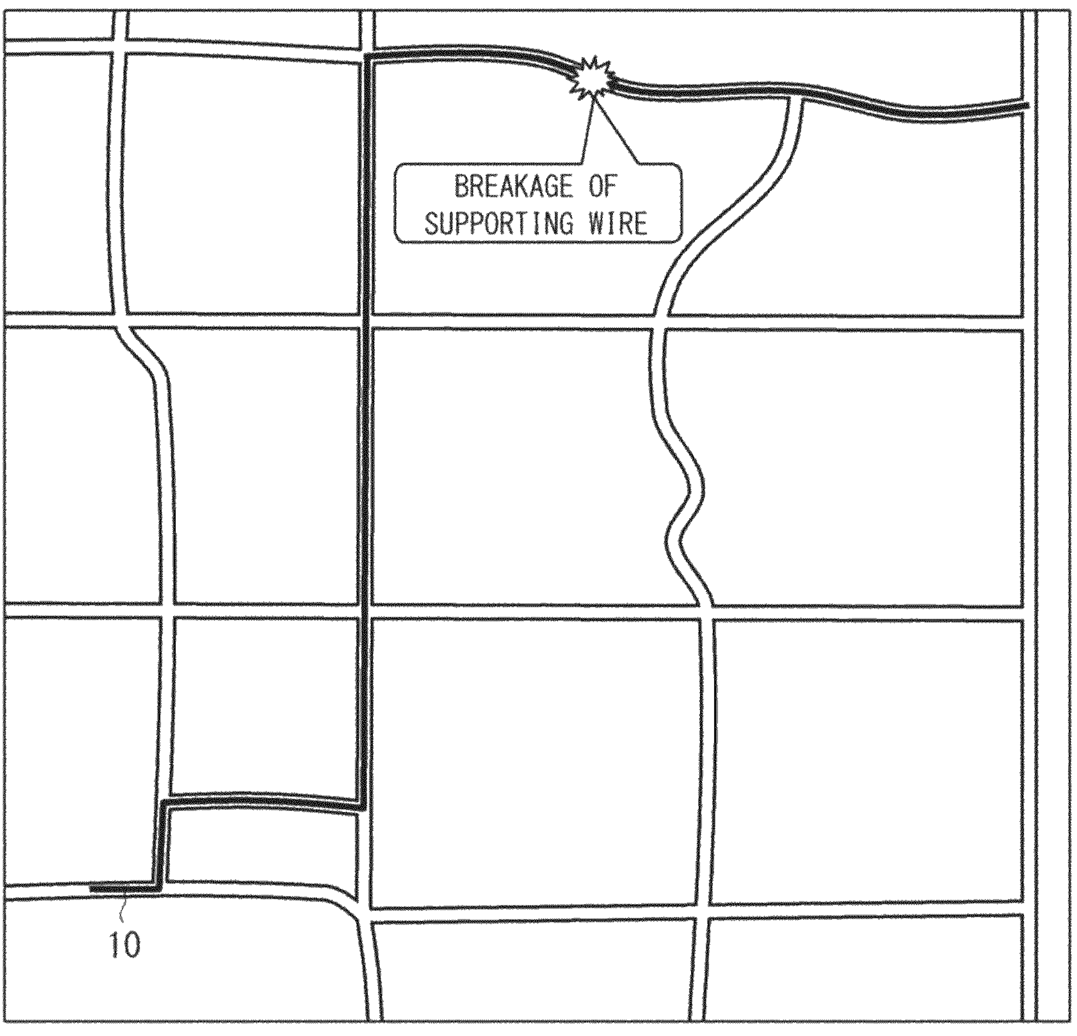
FIG. 11 is a diagram illustrating an example of a GUI screen notified to a predetermined notification destination by a notification unit according to the second example embodiment.

When the detection unit 22 decides that the supporting wire 12 is broken, the notification unit 24 notifies a predetermined notification destination of the fact that the supporting wire 12 is broken and the breaking position of the supporting wire 12. The predetermined notification destination may be, for example, a management center that manages an optical fiber cable 10 or a terminal of an administrator. Further, a notification method may be, for example, a method of sound outputting a message from a speaker of a terminal of a notification destination, or a method of displaying a graphical user interface (GUI) screen on a display, a monitor, or the like of the terminal of the notification destination. FIG. 11 illustrates an example of a GUI screen. In the GUI screen illustrated in FIG. 11, a laying position of the optical fiber cable 10 and the breaking position of the supporting wire 12 are displayed superimposed on a map.

Figure 12:
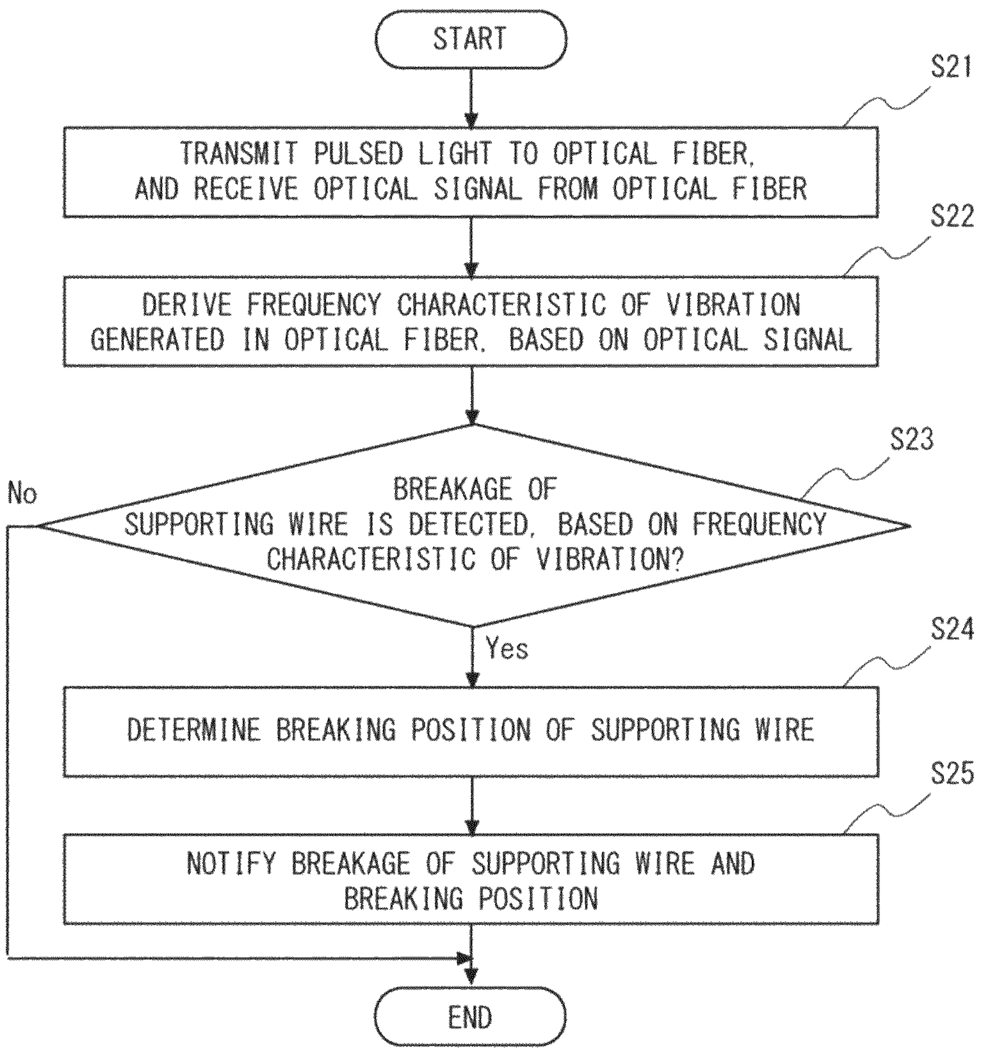
FIG. 12 is a flowchart illustrating an example of a flow of a schematic operation of the optical fiber sensing system according to the second example embodiment.

Subsequently, a schematic operation of the optical fiber sensing system according to the second example embodiment will be described. FIG. 12 illustrates an example of a flow of a schematic operation of the optical fiber sensing system according to the second example embodiment.

As illustrated in FIG. 12, first, processing of steps S21 to S23 similar to steps S11 to S13 in FIG. 8 of the first example embodiment described above is performed.

When the detection unit 22 decides in step S23 that the supporting wire 12 is broken (Yes in step S23), the determination unit 23 determines a breaking position (latitude/longitude) where the supporting wire 12 is broken, based on pulsed light and an optical signal being transmitted and received by the communication unit 21 in step S21 (step S24). Further, the notification unit 24 notifies a predetermined notification destination of the fact that the supporting wire 12 is broken and the breaking position of the supporting wire 12 determined by the determination unit 23 in step S24 (step S25).

On the other hand, when the detection unit 22 does not decide in step S23 that the supporting wire 12 is broken (No in step S23), the processing ends.

As described above, according to the second example embodiment, when the detection unit 22 decides that the supporting wire 12 is broken, the determination unit 23 determines a breaking position (latitude/longitude) where the supporting wire 12 is broken, and the notification unit 24 notifies the predetermined notification destination of the fact that the supporting wire 12 is broken and the breaking position of the supporting wire 12. As a result, it is possible to notify the predetermined notification destination of the fact that the supporting wire 12 is broken and the breaking position of the supporting wire 12.

Other advantageous effects are similar to those of the first example embodiment described above.

Another Example Embodiment

In the first and second example embodiments described above, the communication unit 21, the detection unit 22, the determination unit 23, and the notification unit 24 are provided in the same optical fiber sensing apparatuses 20 and 20A, but the present disclosure is not limited thereto, and may be arranged separately from one another. For example, the communication unit 21, the detection unit 22, the determination unit 23, and the notification unit 24 may be arranged in separate apparatuses one another. Further, the detection unit 22, the determination unit 23, and the notification unit 24 may be arranged on a cloud.

Further, in the first and second example embodiments described above, a condition of a wind speed, at a time when breakage of a supporting wire 12 included in an optical fiber cable 10 is detected, is not provided. However, when the wind speed is high, a frequency characteristic being specific to breakage of the supporting wire 12 may be difficult to distinguish due to appearing strong vibration in the frequency characteristic of vibration. Thus, the detection unit 22 may detect whether the supporting wire 12 is broken, based on a frequency characteristic of vibration generated in an optical fiber 11 when a periphery of the optical fiber cable 10 is in a state of equal to or less than a predetermined wind speed (e.g., wind speed about 2.0 m/s).

Figure 13:
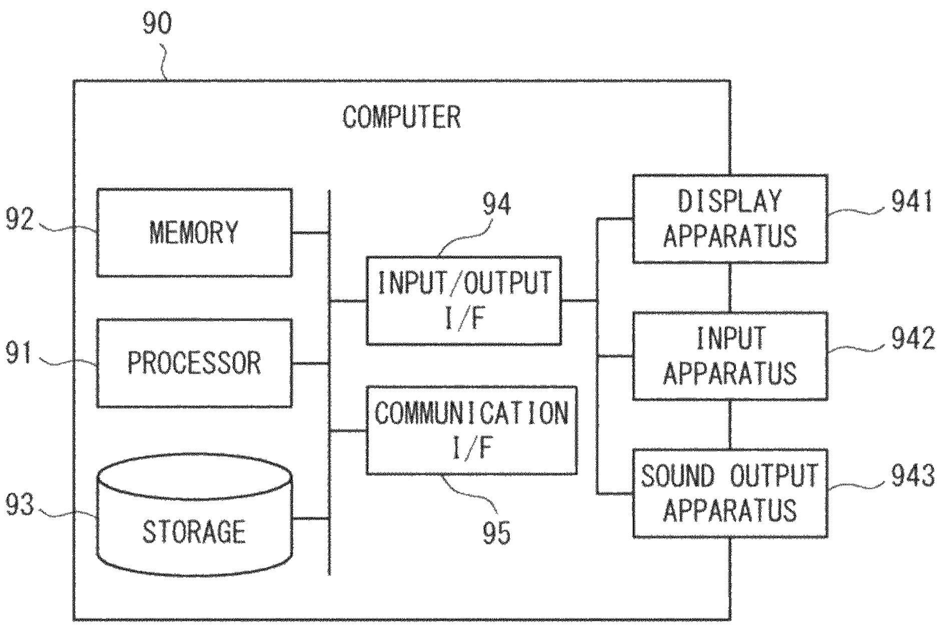
FIG. 13 is a block diagram illustrating a hardware configuration example of a computer that achieves an optical fiber sensing apparatus according to the first and second example embodiments.

Hardware Configuration of Optical Fiber Sensing Apparatus According to Example Embodiment Subsequently, a computer that achieves the optical fiber sensing apparatuses 20 and 20A according to the first and second example embodiments described above will be described. FIG. 13 illustrates a hardware configuration example of a computer 90 that achieves the optical fiber sensing apparatuses 20 and 20A according to the first and second example embodiments described above.

As illustrated in FIG. 13, the computer 90 includes a processor 91, a memory 92, a storage 93, an input/output interface (input/output I/F) 94, a communication interface (communication I/F) 95, and the like. The processor 91, the memory 92, the storage 93, the input/output interface 94, and the communication interface 95 are connected by a data transmission path for transmitting and receiving data to and from one another.

The processor 91 is, for example, an arithmetic processing apparatus such as a central processing unit (CPU) or a graphics processing unit (GPU). The memory 92 is, for example, a memory such as a random access memory (RAM) or a read only memory (ROM). The storage 93 is, for example, a storage apparatus such as a hard disk drive (HDD), a solid state drive (SSD), or a memory card. Further, the storage 93 may be a memory such as a RAM or a ROM.

The storage 93 stores a program achieving a function of a component included in the optical fiber sensing apparatuses 20 and 20A. The processor 91 achieves the function of the component included in the optical fiber sensing apparatuses 20 and 20A by executing each of the programs. Herein, when each of the programs is executed, the processor 91 may read each of the programs on the memory 92 and execute the read program, or may execute the program without reading on the memory 92. Further, the memory 92 and the storage 93 also serve to store information or data held by the component included in the optical fiber sensing apparatuses 20 and 20A.

Further, the above-described program can be stored and provided to a computer (including the computer 90) using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The input/output interface 94 is connected to a display apparatus 941, an input apparatus 942, a sound output apparatus 943, and the like. The display apparatus 941 is an apparatus, such as a liquid crystal display (LCD), a cathode ray tube (CRT) display, or a monitor, that displays a screen associated to drawing data processed by the processor 91. The input apparatus 942 is an apparatus that receives an operation input from an operator, and is, for example, a keyboard, a mouse, a touch sensor, or the like. The display apparatus 941 and the input apparatus 942 may be integrated and achieved as a touch panel. The sound output apparatus 943 is an apparatus, such as a speaker, that sound outputs sound associated to sound data processed by the processor 91.

The communication interface 95 transmits and receives data to and from an external apparatus. For example, the communication interface 95 communicates with an external apparatus via a wired communication path or a wireless communication path.

Although the present disclosure has been described with reference to the example embodiments, the present disclosure is not limited to the above-described example embodiments. Various changes that can be understood by a person skilled in the art within the scope of the present disclosure can be made to the configuration and details of the present disclosure.

For example, the first, second, and another example embodiments can be combined as desirable by one of ordinary skill in the art.

The whole or part of the example embodiments disclosed above can be described as, but not limited to, the following supplementary notes.

(Supplementary Note 1)

An optical fiber sensing system including:

an optical fiber cable configured to include an optical fiber and a supporting wire supporting the optical fiber;

at least one memory configured to store instructions; and at least one processor configured to execute the instructions to transmit pulsed light to the optical fiber, also receive an optical signal from the optical fiber, and derive a frequency characteristic of vibration generated in the optical fiber, based on the optical signal, and detect whether the supporting wire is broken, based on a frequency characteristic of the vibration.

(Supplementary Note 2)

The optical fiber sensing system according to supplementary note 1, wherein the at least one processor is further configured to execute the instructions to detect whether the supporting wire is broken, based on vibration having equal to or less than a predetermined frequency among vibration generated in the optical fiber.

(Supplementary Note 3)

The optical fiber sensing system according to supplementary note 1, wherein the at least one processor is further configured to execute the instructions to, when it is decided that the supporting wire is broken, determine a breaking position where the supporting wire is broken, based on the pulsed light and the optical signal, and notify a predetermined notification destination of a fact that the supporting wire is broken and the breaking position.

(Supplementary Note 4)

The optical fiber sensing system according to supplementary note 1, wherein the at least one processor is further configured to execute the instructions to detect whether the supporting wire is broken, based on a frequency characteristic of vibration generated in the optical fiber when a periphery of the optical fiber cable is in a state of equal to or less than a predetermined wind speed.

(Supplementary Note 5)

The optical fiber sensing system according to supplementary note 1, wherein the optical fiber cable has a structure in which a cable body including the optical fiber and the supporting wire are connected to each other by a neck portion.

(Supplementary Note 6)

An optical fiber sensing apparatus including:

at least one memory configured to store instructions; and at least one processor configured to execute the instructions to transmit pulsed light to an optical fiber in an optical fiber cable including the optical fiber and a supporting wire supporting the optical fiber, also receive an optical signal from the optical fiber, and derive a frequency characteristic of vibration generated in the optical fiber, based on the optical signal, and detect whether the supporting wire is broken, based on a frequency characteristic of the vibration.

(Supplementary Note 7)

The optical fiber sensing apparatus according to supplementary note 6, wherein the at least one processor is further configured to execute the instructions to detect whether the supporting wire is broken, based on vibration having equal to or less than a predetermined frequency among vibration generated in the optical fiber.

(Supplementary Note 8)

The optical fiber sensing apparatus according to supplementary note 6, wherein the at least one processor is further configured to execute the instructions to, when it is decided that the supporting wire is broken, determine a breaking position where the supporting wire is broken, based on the pulsed light and the optical signal, and notify a predetermined notification destination of a fact the supporting wire is broken and the breaking position.

(Supplementary Note 9)

The optical fiber sensing apparatus according to supplementary note 6, wherein the at least one processor is further configured to execute the instructions to detect whether the supporting wire is broken, based on a frequency characteristic of vibration generated in the optical fiber when a periphery of the optical fiber cable is in a state of equal to or less than a predetermined wind speed.

(Supplementary Note 10)

The optical fiber sensing apparatus according to supplementary note 6, wherein the optical fiber cable has a structure in which a cable body including the optical fiber and the supporting wire are connected to each other by a neck portion.

(Supplementary Note 11)

A breakage detection method performed by an optical fiber sensing apparatus, including:

a communication step of transmitting pulse light to an optical fiber in an optical fiber cable including the optical fiber and a supporting wire supporting the optical fiber, and also receiving an optical signal from the optical fiber; and a detection step of deriving a frequency characteristic of vibration generated in the optical fiber, based on the optical signal, and detecting whether the supporting wire is broken, based on a frequency characteristic of the vibration.

(Supplementary note 12)

The breakage detection method according to supplementary note 11, further including, in the detection step, detecting whether the supporting wire is broken, based on vibration having equal to or less than a predetermined frequency among vibration generated in the optical fiber.

(Supplementary note 13)

The breakage detection method according to supplementary note 11, further including:

a determination step of determining, when it is decided by the detection step that the supporting wire is broken, a breaking position where the supporting wire is broken, based on the pulsed light and the optical signal; and a notification step of notifying, when it is decided by the detection step that the supporting wire is broken, a predetermined notification destination of a fact that the supporting wire is broken and the breaking position.

(Supplementary note 14)

The breakage detection method according to supplementary note 11, further including, in the detection step, detecting whether the supporting wire is broken, based on a frequency characteristic of vibration generated in the optical fiber when a periphery of the optical fiber cable is in a state of equal to or less than a predetermined wind speed.

(Supplementary note 15)

The breakage detection method according to supplementary note 11, wherein the optical fiber cable has a structure in which a cable body including the optical fiber and the supporting wire are connected to each other by a neck portion.

What is claimed is:

1. An optical fiber sensing system comprising:

an optical fiber cable configured to include an optical fiber and a supporting wire supporting the optical fiber;

at least one memory configured to store instructions; and at least one processor configured to execute the instructions to transmit pulsed light to the optical fiber, also receive an optical signal from the optical fiber, and derive a frequency characteristic of vibration generated in the optical fiber, based on the optical signal, and detect whether the supporting wire is broken, based on a frequency characteristic of the vibration.

2. The optical fiber sensing system according to claim 1, wherein the at least one processor is further configured to execute the instructions to detect whether the supporting wire is broken, based on vibration having equal to or less than a predetermined frequency among vibration generated in the optical fiber.

3. The optical fiber sensing system according to claim 1, wherein the at least one processor is further configured to execute the instructions to, when it is decided that the supporting wire is broken, determine a breaking position where the supporting wire is broken, based on the pulsed light and the optical signal, and notify a predetermined notification destination of a fact that the supporting wire is broken and the breaking position.

4. The optical fiber sensing system according to claim 1, wherein the at least one processor is further configured to execute the instructions to detect whether the supporting wire is broken, based on a frequency characteristic of vibration generated in the optical fiber when a periphery of the optical fiber cable is in a state of equal to or less than a predetermined wind speed.

5. The optical fiber sensing system according to claim 1, wherein the optical fiber cable has a structure in which a cable body including the optical fiber and the supporting wire are connected to each other by a neck portion.

6. An optical fiber sensing apparatus comprising:

at least one memory configured to store instructions; and at least one processor configured to execute the instructions to transmit pulsed light to an optical fiber in an optical fiber cable including the optical fiber and a supporting wire supporting the optical fiber, also receive an optical signal from the optical fiber, and derive a frequency characteristic of vibration generated in the optical fiber, based on the optical signal, and detect whether the supporting wire is broken, based on a frequency characteristic of the vibration.

7. The optical fiber sensing apparatus according to claim 6, wherein the at least one processor is further configured to execute the instructions to detect whether the supporting wire is broken, based on vibration having equal to or less than a predetermined frequency among vibration generated in the optical fiber.

8. The optical fiber sensing apparatus according to claim 6, wherein the at least one processor is further configured to execute the instructions to, when it is decided that the supporting wire is broken, determine a breaking position where the supporting wire is broken, based on the pulsed light and the optical signal, and notify a predetermined notification destination of a fact that the supporting wire is broken and the breaking position.

9. The optical fiber sensing apparatus according to claim 6, wherein the at least one processor is further configured to execute the instructions to detect whether the supporting wire is broken, based on a frequency characteristic of vibration generated in the optical fiber when a periphery of the optical fiber cable is in a state of equal to or less than a predetermined wind speed.

10. The optical fiber sensing apparatus according to claim 6, wherein the optical fiber cable has a structure in which a cable body including the optical fiber and the supporting wire are connected to each other by a neck portion.

11. A breakage detection method performed by an optical fiber sensing apparatus, comprising:

a communication step of transmitting pulse light to an optical fiber in an optical fiber cable including the optical fiber and a supporting wire supporting the optical fiber, and also receiving an optical signal from the optical fiber; and a detection step of deriving a frequency characteristic of vibration generated in the optical fiber, based on the optical signal, and detecting whether the supporting wire is broken, based on a frequency characteristic of the vibration.

12. The breakage detection method according to claim 11, further comprising, in the detection step, detecting whether the supporting wire is broken, based on vibration having equal to or less than a predetermined frequency among vibration generated in the optical fiber.

13. The breakage detection method according to claim 11, further comprising:

a determination step of determining, when it is decided by the detection step that the supporting wire is broken, a breaking position where the supporting wire is broken, based on the pulsed light and the optical signal; and a notification step of notifying, when it is decided by the detection step that the supporting wire is broken, a predetermined notification destination of a fact that the supporting wire is broken and the breaking position.

14. The breakage detection method according to claim 11, further comprising, in the detection step, detecting whether the supporting wire is broken, based on a frequency characteristic of vibration generated in the optical fiber when a periphery of the optical fiber cable is in a state of equal to or less than a predetermined wind speed.

15. The breakage detection method according to claim 11, wherein the optical fiber cable has a structure in which a cable body including the optical fiber and the supporting wire are connected to each other by a neck portion.

* * * * *